United States Patent
Huang et al.

(10) Patent No.: US 8,749,712 B2
(45) Date of Patent: Jun. 10, 2014

(54) METHOD FOR PROCESSING ON-SCREEN DISPLAY AND ASSOCIATED EMBEDDED SYSTEM

(75) Inventors: Tzukui Huang, Hsinchu Hsien (TW);
Chien-You Chen, Hsinchu Hsien (TW);
Ching Ju Ko, Hsinchu Hsien (TW);
Meng Chieh Yeh, Hsinchu Hsien (TW);
Cheng Hao Li, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 445 days.

(21) Appl. No.: 12/818,734

(22) Filed: Jun. 18, 2010

(65) Prior Publication Data
US 2010/0321575 A1 Dec. 23, 2010

Related U.S. Application Data

(60) Provisional application No. 61/218,077, filed on Jun. 18, 2009.

(51) Int. Cl.
*H04N 5/445* (2011.01)
*H04N 5/50* (2006.01)
*G09G 5/00* (2006.01)

(52) U.S. Cl.
USPC ............................ 348/569; 348/563; 345/649

(58) Field of Classification Search
USPC .................................. 348/569, 563; 345/649
See application file for complete search history.

(56) References Cited

U.S. PATENT DOCUMENTS

| 5,825,997 A * | 10/1998 | Yamada et al. ............... 345/419 |
| 2005/0120306 A1 | 6/2005 | Klassen et al. |
| 2007/0019111 A1* | 1/2007 | Won ............................. 348/569 |
| 2007/0136681 A1* | 6/2007 | Miller .......................... 715/782 |
| 2007/0247455 A1* | 10/2007 | Hyun ........................... 345/419 |
| 2007/0250787 A1* | 10/2007 | Kawahara et al. ............. 715/782 |

FOREIGN PATENT DOCUMENTS

WO  2005055034  6/2005

OTHER PUBLICATIONS

Taiwan Intellectual Property Office, Office Action, Apr. 25, 2013, Taiwan.

* cited by examiner

*Primary Examiner* — Brian Yenke
(74) *Attorney, Agent, or Firm* — WPAT, PC; Justin King

(57) ABSTRACT

An embedded system for processing an on-screen display (OSD) includes an input apparatus, a user interface resource storage unit and a two-dimensional (2D) graphic engine. The method for processing the OSD includes receiving a control command associated with a 2D image processing procedure, the 2D image processing procedure generating a transitional image according to a first 2D image and a second 2D image, and displaying the first 2D image, the transitional image and the second 2D image to render a three-dimensional-like (3D-like) OSD.

20 Claims, 11 Drawing Sheets

METHOD FOR PROCESSING ON-SCREEN DISPLAY AND ASSOCIATED EMBEDDED SYSTEM

CROSS REFERENCE TO RELATED PATENT APPLICATION

This patent application is based on a U.S. provisional patent application No. 61/218,077 filed on Jun. 18, 2009.

FIELD OF THE INVENTION

The present invention relates to a method for processing an on-screen display (OSD) and an associated embedded system, and more particularly, to a method for processing an OSD capable of rendering a three-dimensional-like (3D-like) OSD and an associated embedded system.

BACKGROUND OF THE INVENTION

A user interface of a television is usually constructed by buttons provided on a housing of the television or devices such as a remote control in conjunction with an on-screen display (OSD) represented on a monitor of the television. More specifically, in an OSD, certain texts or graphics are generated and displayed on the monitor via an OSD controller so that the user obtains messages from the television. For example, when the user switches channels, or adjusts the volume or display quality with the aid of the buttons on the housing or via the remote control, the OSD controller shows information associated with the above user actions by displaying texts and graphics at appropriate positions on the monitor, so as to facilitate the user to complete adjusting and controlling various values and functions of the television as well as providing information of different programs.

Referring to FIGS. 1A and 1B showing schematic diagrams of OSD, when the user presses a menu button 110 on a remote control 11, apart from displaying an image of a television program, a monitor 100 of a television 10 also displays a first function menu 121 as shown in FIG. 1A. However, along with the ever-growing functionality of television, the first function menu 121 no longer accommodates all function options, such that the monitor 100 also displays a second function menu 122 as shown in FIG. 1B when the user presses a change-page button 111 on the remote control 11. During the switching from the first function menu 121 to the second function menu 122, direct image replacement is generally adopted by the prior art, which does not attend to any visual effects during the switching. Further, since the OSD controller in the television supports only common two-dimensional image processing, sophisticated visual effects that can leave the user with an impression are also rather difficult to achieve. Therefore, it is an object of the invention to improve the above shortcomings of the prior art.

SUMMARY OF THE INVENTION

The invention provides a method for processing an on-screen display (OSD) applied to an embedded system to render a three-dimensional-like (3D-like) OSD. The method comprises: receiving a control command associated with a two-dimensional (2D) image processing procedure; the 2D image processing procedure generating a transitional image according to a first 2D image and a second 2D image; and displaying the first 2D image, the transitional image and the second 2D image to render the 3D-like OSD in response to the control command.

In the method for processing an OSD of the invention, the 3D-like OSD renders a 3D cube rotational effect, a 3D page-turning effect or a rotating menu with a depth and focal effect.

The invention further provides an embedded system capable of rendering a 3D-like OSD. The embedded system comprises: an input device, for inputting a control command associated with a 2D image processing procedure; a user interface resource storage unit, for providing a first 2D image and a second 2D image; and a 2D graphic engine, coupled to the input device and the user interface resource storage unit, for generating a transitional image according to the first 2D image and the second 2D image to display the 3D-like OSD in response to the control command.

In the embedded system for processing an OSD of the invention, the 3D-like OSD renders a 3D cube rotational effect, a 3D page-turning effect or a rotating menu with a depth and focal effect.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 2:
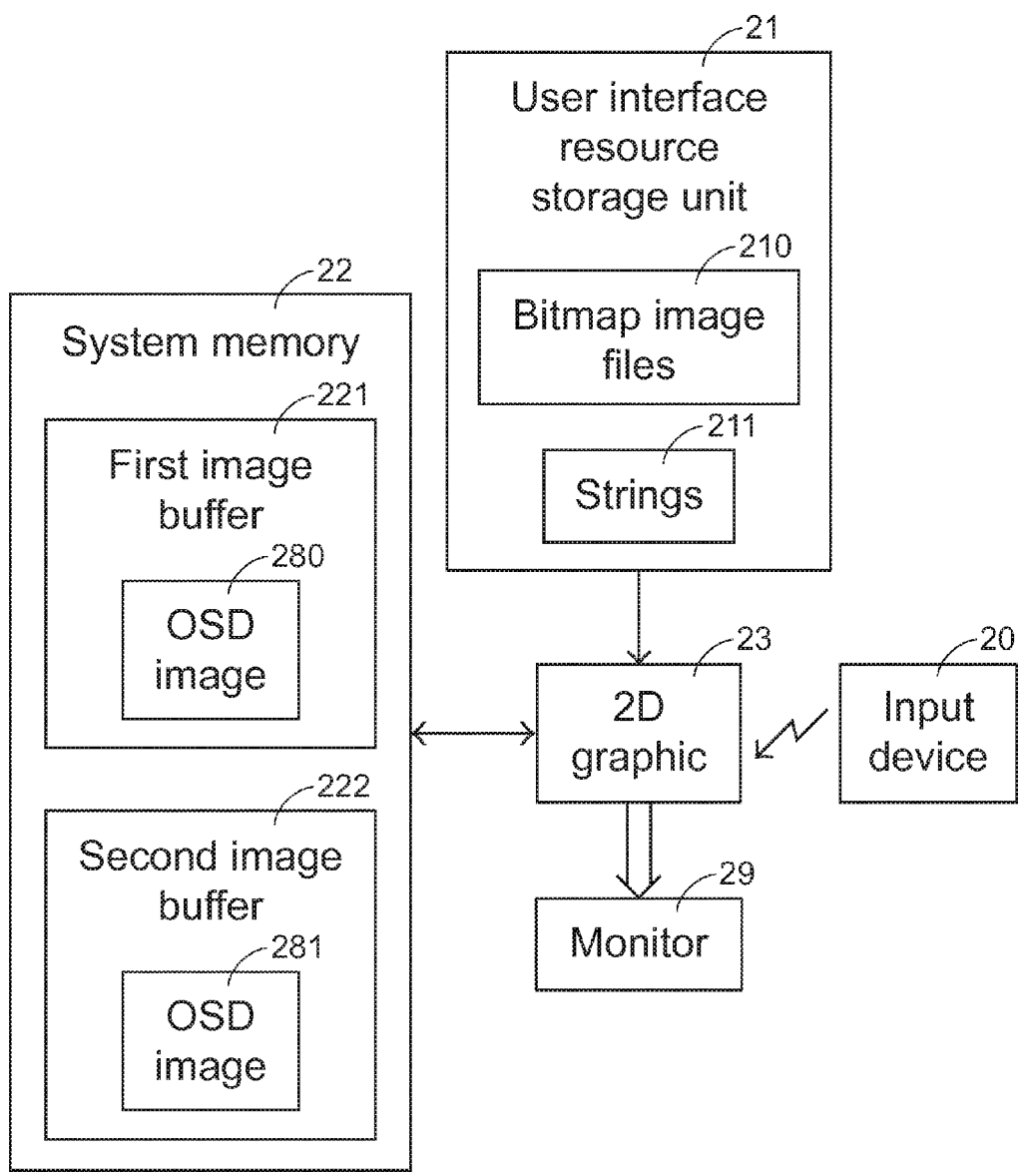
FIG. 2 is a functional block diagram of an embedded system applying a method of the invention.

To improve the shortcomings associated with the prior art, the invention provides a method for processing an on-screen display (OSD) and an embedded system applying the method. Referring to FIG. 2, an embedded system according to an embodiment of the invention, capable of receiving a control command from an input device 20, comprises a user interface resource storage unit 21, a system memory 22 and a two-dimensional (2D) graphic engine 23. The user interface resource storage unit 21 comprises built-in 2D images, e.g., bitmap image files 210 and strings 211. The 2D graphic engine 23 generates an OSD to be displayed on a monitor 29 from the 2D images in the user interface resource storage unit

21. To enhance performance in image processing, the system memory 22 comprises two image buffers—a first image buffer 221 and a second image buffer 222, for respectively storing an OSD image 280 and an OSD image 281 generated by the 2D graphic engine 23. For example, the first image buffer 221 is utilized as an off-screen buffer, and the second image buffer 222 is utilized as an on-screen buffer. From the on-screen buffer, the OSD image 281 is outputted via the 2D graphic engine 23 to the monitor 29; and the off-screen buffer is for storing the next OSD image 280 to be displayed. To display a next OSD image, the OSD image 280 is duplicated to the second image buffer 222 to replace the OSD image 281 and then displayed. Alternatively, the first image buffer 221 may serve as the on-screen buffer and the second image buffer may serve as the off-screen buffer, such that a next OSD image to be displayed may be first be stored in the first image buffer 221 and then displayed.

Figure 1A:
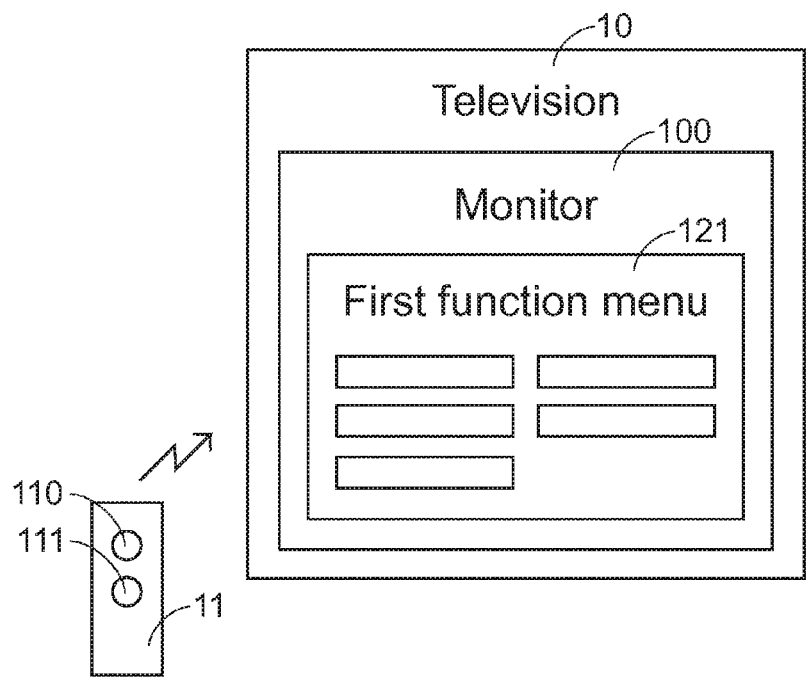
FIGS. 1A and 1B are schematic diagrams of a conventional OSD.
Figure 1B:
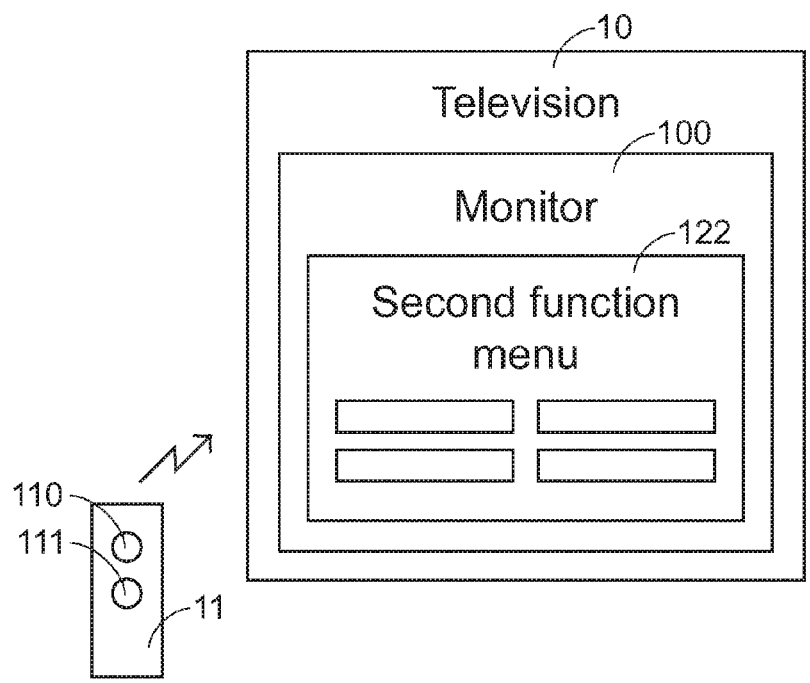
Figure 3:
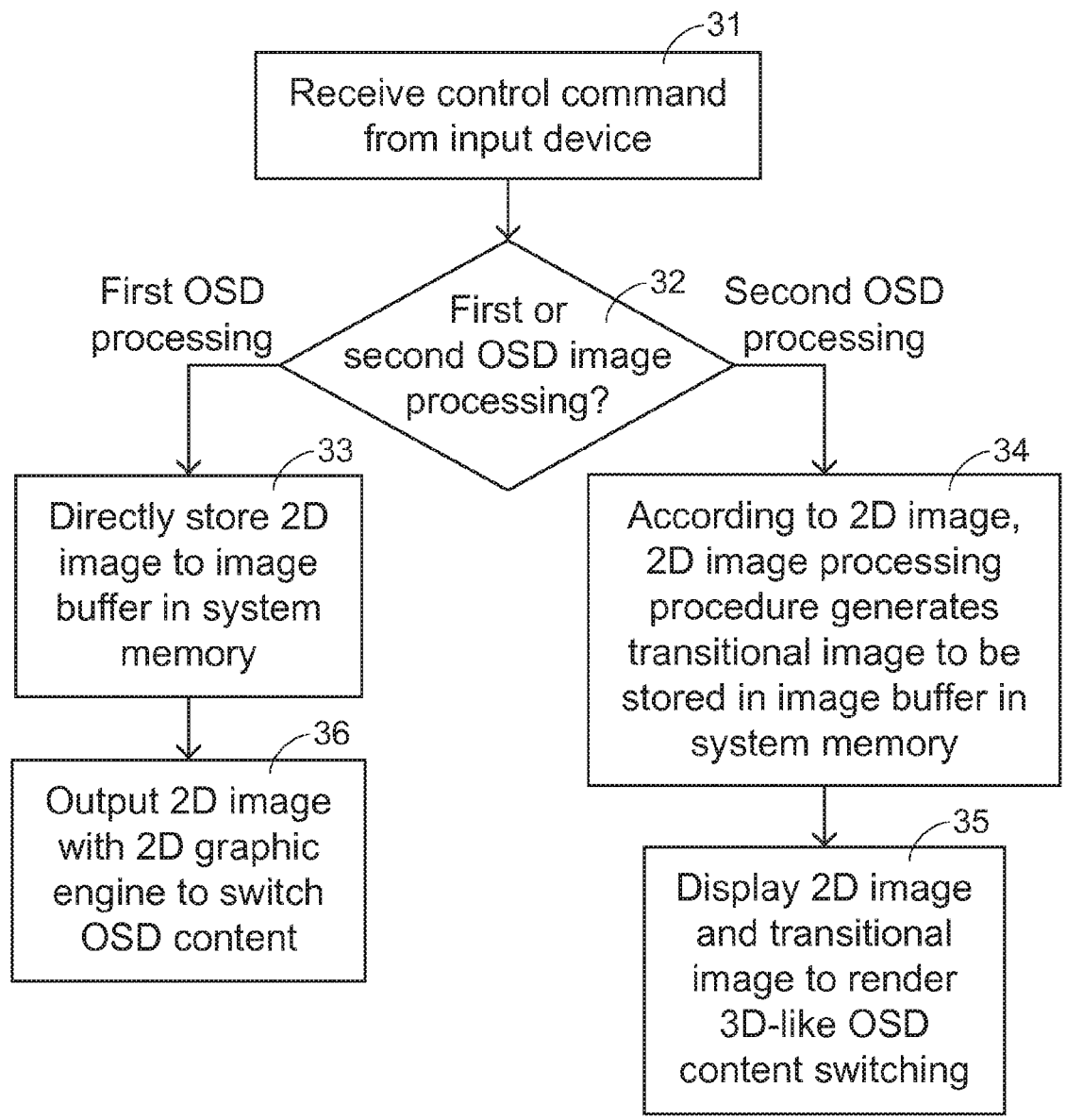
FIG. 3 is a flowchart of a method for processing an OSD according to an embodiment of the invention.

FIG. 3 shows a flowchart of a method for processing an OSD according to an embodiment of the invention. The method starts with Step 31 in which the foregoing embedded system receives a control command from the input device 20, which may be, for example, a button on a housing of a television or a common remote control. The control command may be transmitted via the input device to an embedded system such as a television or a digital set-up-box to switch channels, or adjust the volume or image quality. In Step 32, the embedded system then determines whether to proceed with a first OSD processing or a second OSD processing. The first OSD processing is the conventional 2D OSD processing as shown in FIGS. 1A and 1B; the second OSD processing is the method for rendering a 3D-like OSD according to the invention. When the method is to proceed to the second OSD processing, Step 34 is performed by a 2D image processing procedure associated with the control command. In Step 34, the 2D image processing procedure generates at least one transitional image according to at least one 2D image, and stores the at least one 2D transitional image into an image buffer in the system memory 22. In Step 35, via the 2D graphic engine 23, the at least 2D image and the at least one 2D transitional image are consecutively displayed to switch content of the OSD in a 3D-like manner. In contrast, when the method is to proceed to the first OSD processing, Step 33 is performed to directly store a 2D image from the user interface resource storage unit 21 to the image buffer in the system memory 22. In Step 36, the 2D image is outputted by the 2D graphic engine 23 to accomplish content switching of the OSD.

Steps 34 and 35 may be iterated to achieve a more sophisticated 3D-like OSD. Several examples of 3D-like OSD are given below.

Figure 4A:
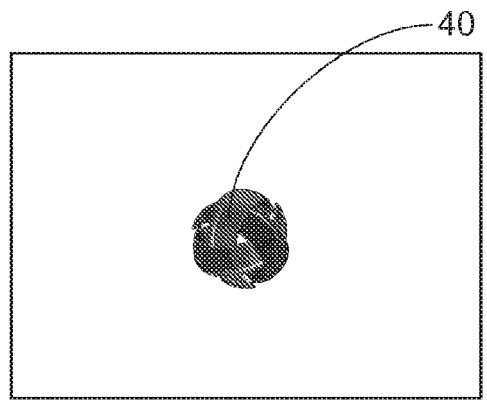
FIGS. 4A to 4C are schematic diagrams of generating 2D transitional images using 2D images and a 2D image processing procedure according to a first embodiment of the invention.
Figure 4B:
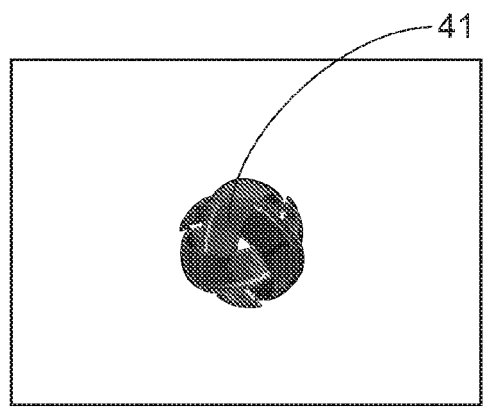
Figure 4C:
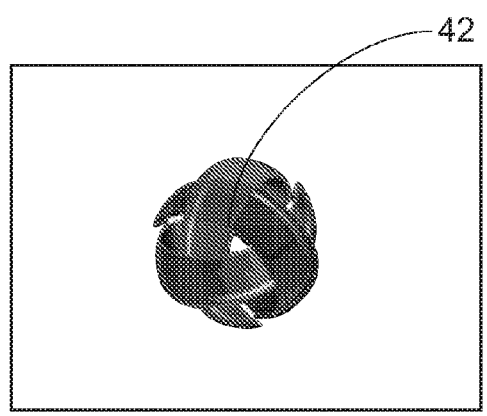

FIGS. 4A to 4C show schematic diagrams of generating 2D transitional images using 2D images and a 2D image processing procedure according to a first embodiment of the invention, wherein FIG. 4A illustrates a 2D image 40 stored in the user interface resource storage unit 21. The 2D image processing procedure comprises: increasing or decreasing pixels of the 2D image 40 (e.g., by pixel interpolation) to transform the 2D image 40 to transitional images 41 and 42 having a larger size than that of the 2D image 40, as respectively shown in FIGS. 4B and 4C, or to transitional images having a smaller size (not shown); storing the transitional images 41 and 42 to an image buffer in the system memory 22; displaying the images 40, 41 and 42 using the 2D graphic engine 23 to render a 3D-like OSD that shows a 3D effect of moving from afar to near.

Figure 5:
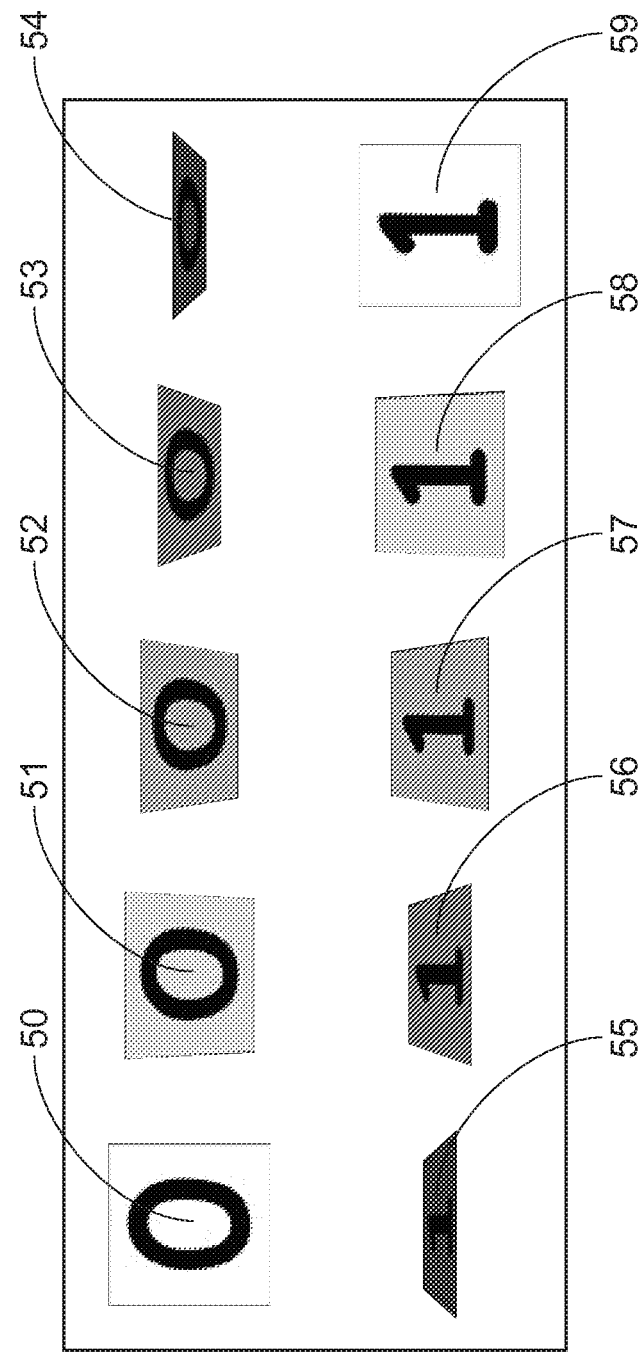
FIG. 5 is a schematic diagram of generating 2D transitional images using 2D images and a 2D image processing procedure according to a second embodiment of the invention.

FIG. 5 shows schematic diagrams of generating 2D transitional images using 2D images and a 2D image processing procedure according to a second embodiment of the invention. In this embodiment, a first 2D image 50 and a second 2D image 59 stored in the user interface resource storage unit 21 represent channel numbers, and the control command is a switching channel command. The 2D image processing procedure associated with the control command comprises: increasing or decreasing pixels of the first 2D image 50 to transform the rectangular first 2D image 50 to trapezoidal transitional images 51, 52, 53 and 54; increasing or decreasing pixels of the second 2D image 51 to transform the rectangular second 2D image to trapezoidal transitional images 58, 57, 56 and 55; storing the transitional images 51 to 58 into the image buffer in the system memory 22; and displaying in sequence the images 50, 51, 52, 53, 54, 55, 56, 57, 58 and 59 using the 2D graphic engine to achieve content switching of the OSD in a 3D flipping effect.

Figure 6:
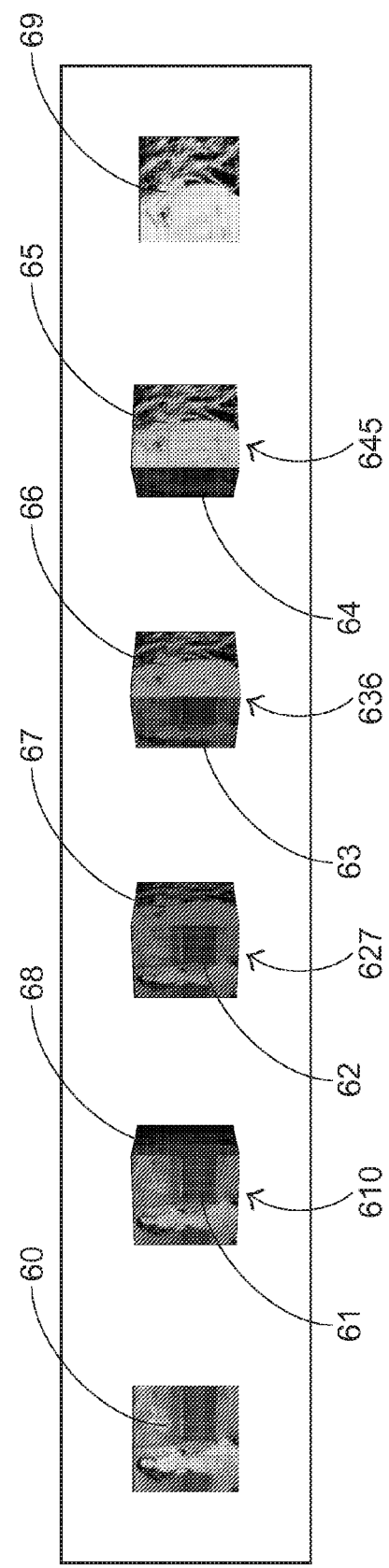
FIG. 6 is a schematic diagram of generating 2D transitional images using 2D images and a 2D image processing procedure according to a third embodiment of the invention.

FIG. 6 shows a schematic diagram of generating 2D transitional images using 2D images and a 2D image processing procedure according to a third embodiment of the invention. In FIG. 6, a first 2D image 60 and a second 2D image in the user interface resource storage unit 21 represent different menus, and are rectangular in shape. In this embodiment, the control command is a menu switching command. The 2D image processing image procedure associated with the control command comprises: increasing or decreasing pixels of the first 2D image 60 to transform the rectangular first 2D image 60 into a trapezoidal third 2D image 61; increasing or decreasing pixels of the second 2D image 69 to transform the rectangular second 2D image 69 to a trapezoidal fourth 2D image 68; combining the third trapezoidal third 2D image 61 and the trapezoidal fourth 2D image 68 to a transitional image 618 (similarly, trapezoidal transitional third images 62, 63 and 64 are respectively combined with transitional fourth 2D images 67, 66 and 65 to form transitional images 627, 636 and 645); and displaying in sequence the images 60, 618, 627, 636, 645 and 69 to achieve content switching with a 3D-like OSD and render a 3D cubic rotational effect.

Figure 7:
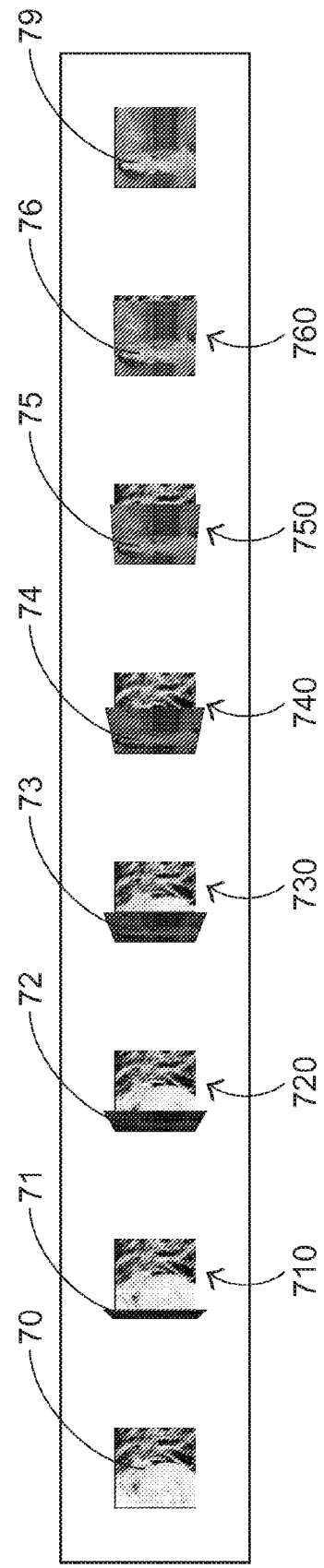
FIG. 7 is a schematic diagram of generating 2D transitional images using 2D images and a 2D image processing procedure according to a fourth embodiment of the invention.
Figure 8A:
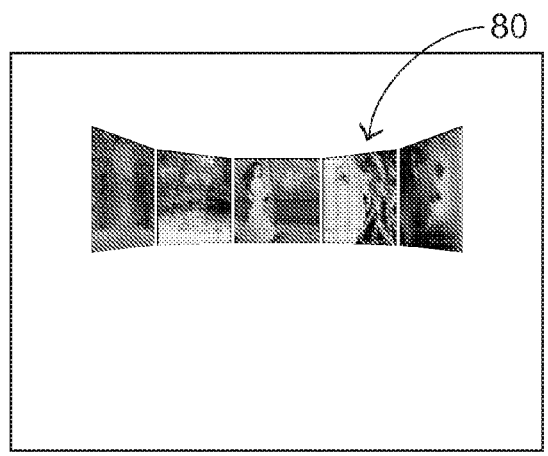
FIGS. 8A to 8F are schematic diagrams of generating 2D transitional images using 2D images and a 2D image processing procedure according to a fifth embodiment of the invention.
Figure 8B:
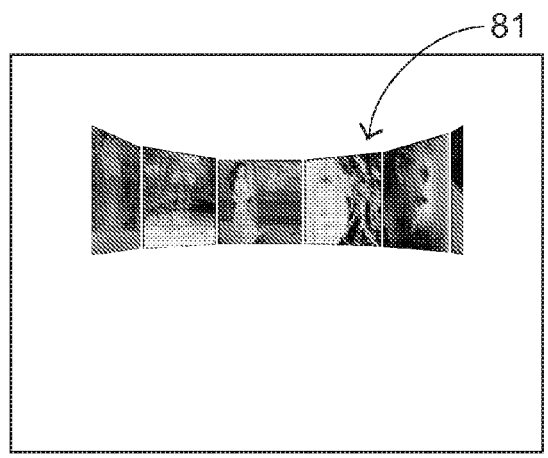
Figure 8C:
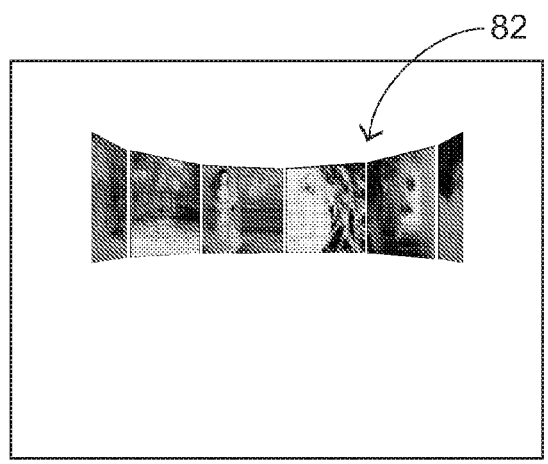
Figure 8D:
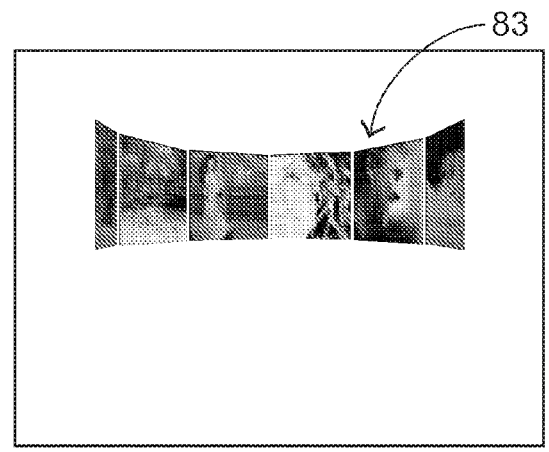
Figure 8E:
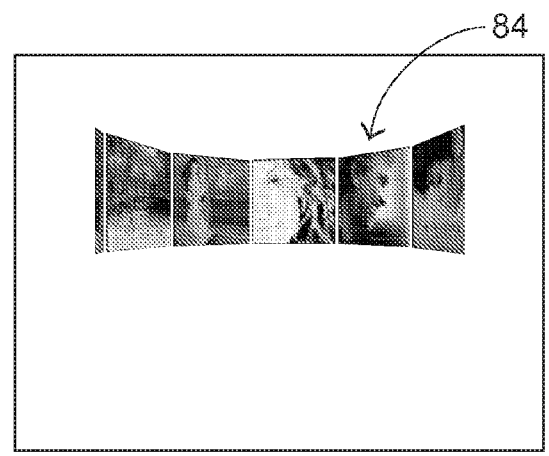
Figure 8F:
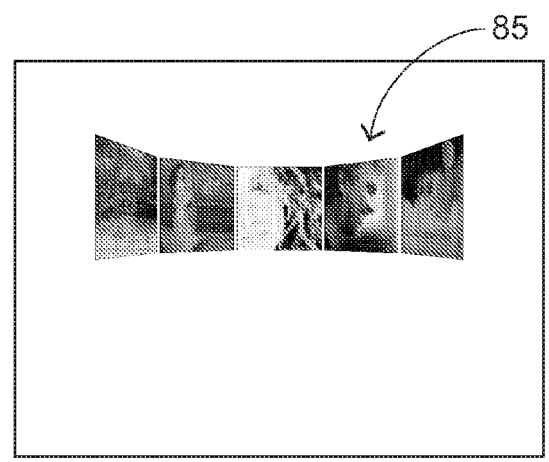
Figure 9A:
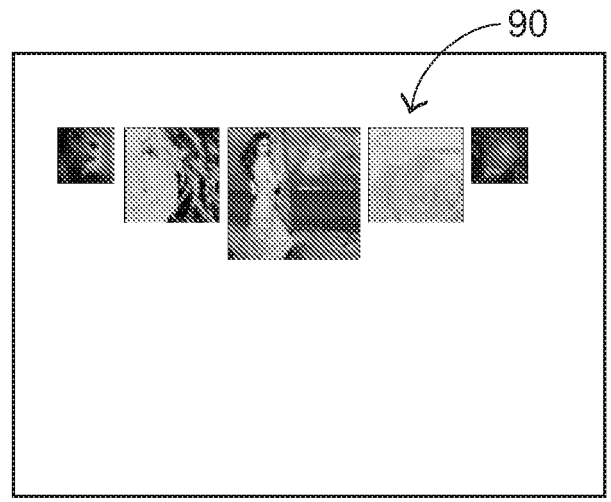
FIGS. 9A to 9D are schematic diagrams of generating 2D transitional images using 2D images and a 2D image processing procedure according to a fifth embodiment of the invention.
Figure 9B:
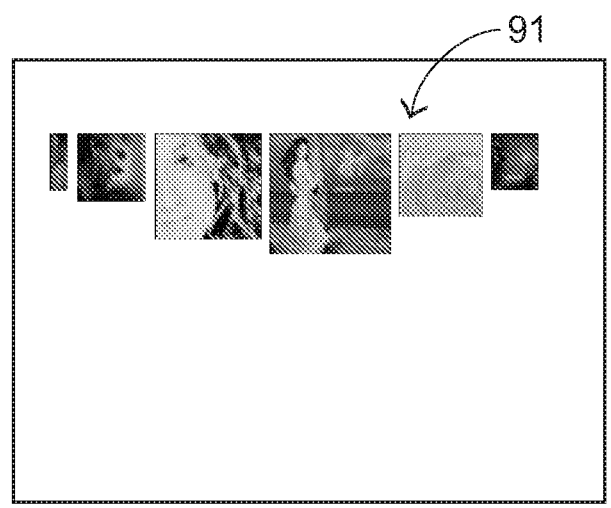
Figure 9C:
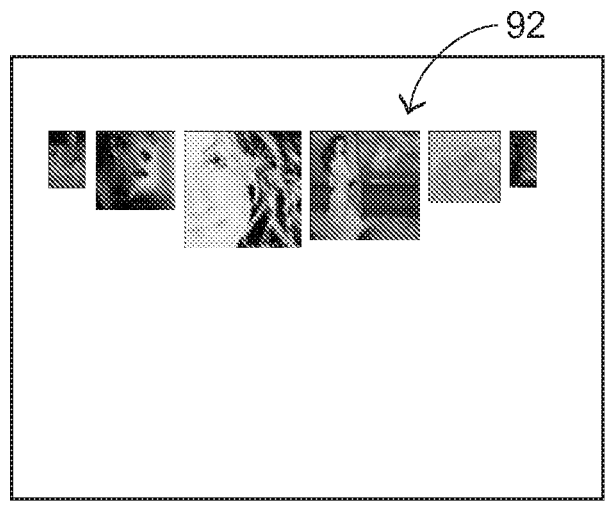
Figure 9D:
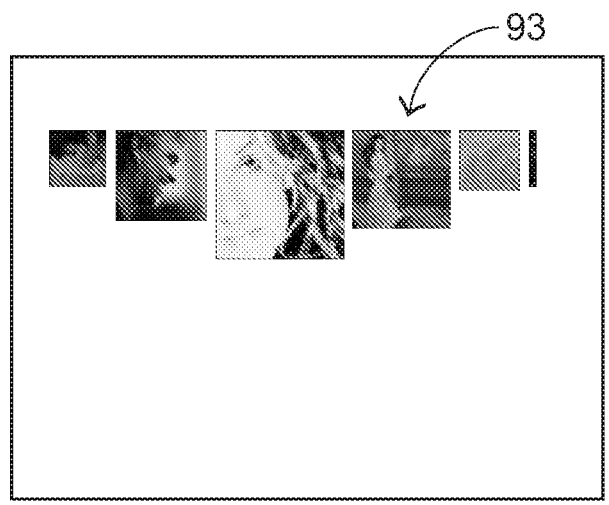

FIG. 7 shows a schematic diagram of generating 2D transitional images using 2D images in the user interface resource storage unit 21 and a 2D image processing procedure according to a fourth embodiment of the invention. In FIG. 6, a first 2D image 60 and a second 2D image in the user interface resource storage unit 21 represent different menus, and are rectangular in shape. In this embodiment, the control command is a menu switching command. The 2D image processing image procedure associated with the control command comprises: increasing or decreasing pixels of the first 2D image 60 to transform the rectangular first 2D image 60 into a trapezoidal third 2D image 61; increasing or decreasing pixels of the second 2D image 69 to transform the rectangular second 2D image 69 to a trapezoidal fourth 2D image 68; combining the third trapezoidal third 2D image 61 and the trapezoidal fourth 2D image 68 to a transitional image 618 (similarly, trapezoidal transitional third images 62, 63 and 64 are respectively combined with transitional fourth 2D images 67, 66 and 65 to form transitional images 627, 636 and 645); and displaying in sequence the images 60, 618, 627, 636, 645 and 69 to achieve content switching with a 3D-like OSD and render a 3D cubic rotational effect.

FIGS. 8A to 8F show schematic diagrams of generating 2D transitional images using 2D images in the user interface resource storage unit 21 and a 2D image processing procedure according to a fifth embodiment of the invention. In this embodiment, the user interface resource storage unit 21 comprises a plurality of first 2D images representing different menus, the first 2D images are quadrilateral in shape (e.g., square, rectangular or trapezoidal), and the control command is a menu switching command. The 2D image processing image procedure associated with the control command comprises: increasing or decreasing pixels of the plurality of first 2D images to transform the quadrilateral first 2D images into a plurality of second 2D images in another quadrilateral form; combining the plurality of second 2D images in the another quadrilateral form to transitional images 80, 81, 82, 83, 84 and 85 to be stored into the image buffer in the system memory 22; and displaying in sequence the images 80, 81, 82, 83, 84 and 85 to achieve OSD content switching with a 3D-like OSD and render a 3D rotating menu with a depth effect.

FIGS. 9A to 9D show schematic diagrams of generating 2D transitional images using 2D images in the user interface resource storage unit 21 and a 2D image processing procedure according to a sixth embodiment of the invention. In this embodiment, the user interface resource storage unit 21 comprises a plurality of first 2D images representing different menus, and the control command is a menu switching command. The 2D image processing image procedure associated with the control command comprises: increasing or decreasing pixels of the plurality of first 2D images to transform the plurality of first 2D images to a plurality of second 2D images that are smaller or larger in size; combining the plurality of second 2D images to generate transitional images 90, 91, 92 and 93 to be stored into the image buffer in the system memory 22; and displaying in sequence the images 90, 91, 92 and 93 to achieve OSD content switching with a 3D-like OSD and render a 3D rotating menu with a depth and focal effect.

Further, in the 2D image processing procedure, parameters such as rotation angles and the number of frames of the transitional images to give more enhance image quality.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for processing an on-screen display (OSD), applied to an embedded system, for rendering a two dimensional representation of an emulated three dimensional (3D) OSD, the method comprising:
   receiving a control command associated with a two-dimensional (2D) image processing procedure;
   generating a transitional image according to a first 2D image and a second 2D image by the 2D image processing procedure;
   storing the transitional image into an image buffer in a memory of the embedded system;
   consecutively displaying the first 2D image, the transitional image, and the second 2D image to render the images in accordance with the emulated 3D OSD in response to the control command; and
   iterating generation of respective intermediate transitional images derived by transforming a respective initial 2D image and a respective target 2D image into a respective intermediate transitional image by the 2D image processing procedure, storing each respective intermediate transitional image into the image buffer in the memory of the embedded system, and consecutively displaying the respective initial 2D image, the respective intermediate transitional image, and the respective target 2D image to render the images in accordance with the emulated 3D OSD in response to the control command, until a final 2D image is rendered and terminates the image processing performed in association with the control command.

2. The method as claimed in claim 1, wherein the first 2D image and the second 2D image are rectangular.

3. The method as claimed in claim 2, wherein the 2D image processing procedure comprises:
   increasing or decreasing pixels of the first 2D image to transform the rectangular first 2D image to a trapezoidal transitional image.

4. The method as claimed in claim 2, wherein the 2D image processing procedure comprises:
   increasing or decreasing pixels of the first 2D image to transform the rectangular first 2D image to a trapezoidal third 2D image; and
   combining the trapezoidal third 2D image with the second 2D image to generate the transitional image.

5. The method as claimed in claim 2, wherein the 2D image processing procedure comprises:
   increasing or decreasing pixels of the first 2D image to transform the rectangular first 2D image to a trapezoidal third 2D image;
   increasing or decreasing pixels of the second 2D image to transform the rectangular second 2D image to a trapezoidal fourth 2D image; and
   combining the trapezoidal third 2D image with the trapezoidal fourth 2D image to form the transitional image.

6. The method as claimed in claim 1, wherein the first 2D image comprises a first area and a second area, and the 2D image processing procedure comprises:
   increasing or decreasing pixels of the first area of the first 2D image to generate the transitional image.

7. The method as claimed in claim 1, wherein the transitional image is stored in an off-screen image buffer and transferred to an on-screen buffer when the transitional image is to be displayed.

8. The method as claimed in claim 1, wherein the 3D OSD shows a 3D cube rotational effect.

9. The method as claimed in claim 1, wherein the 3D OSD shows a 3D page-turning effect.

10. The method as claimed in claim 1, wherein the 3D OSD shows a rotational menu with a depth and focal effect.

11. An embedded system, for rendering a two dimensional representation of an emulated three dimensional (3D) OSD, comprising:
    an input device, configured for inputting a control command associated with a 2D image processing procedure;
    a user interface resource storage unit, configured for storing a first 2D image and a second 2D image;
    a system memory unit having at least one image buffer, configured for storing generated transitional images;
    a 2D graphic engine, coupled to the user interface resource storage unit, configured for:
      generating a transitional image according to the first 2D image and the second 2D image;
      consecutively displaying the first 2D image, the transitional image, and the second 2D image to render the images in accordance with the emulated 3D OSD in response to the control command; and
      iterating generation of respective intermediate transitional images derived by transforming a respective initial 2D image and a respective target 2D image into a respective intermediate transitional image by the 2D image processing procedure, storing each respective intermediate transitional image into a respective image buffer, and consecutively displaying the respective initial 2D image, the respective intermediate transitional image, and the respective target 2D image to render the images in accordance with the emulated 3D OSD in response to the control command, until a final 2D image is rendered and terminates the image processing performed in association with the control command.

12. The embedded system as claimed in claim 11, wherein the first 2D image and the second 2D image are rectangular.

13. The embedded system as claimed in claim 12, wherein the 2D image processing procedure comprises:
increasing or decreasing pixels of the first 2D image to transform the rectangular first 2D image to a trapezoidal transitional image.

14. The embedded system as claimed in claim 12, wherein the 2D image processing procedure comprises:
increasing or decreasing pixels of the first 2D image to transform the rectangular first 2D image to a trapezoidal third 2D image; and
combining the trapezoidal third 2D image with the second 2D image to generate the transitional image.

15. The embedded system as claimed in claim 12, wherein the 2D image
processing procedure comprises:
increasing or decreasing pixels of the first 2D image to transform the rectangular first 2D image to a trapezoidal third 2D image;
increasing or decreasing pixels of the second 2D image to transform the rectangular second 2D image to a trapezoidal fourth 2D image; and
combining the trapezoidal third 2D image with the trapezoidal fourth 2D image to generate the transitional image.

16. The embedded system as claimed in claim 11, wherein the first 2D
image comprises a first area and a second area, and the 2D image processing procedure comprises:
increasing or decreasing pixels of the first area of the first 2D image to generate the transitional image.

17. The embedded system as claimed in claim 11, further comprising an off-screen buffer and an on-screen buffer, and the transitional image is stored in the off-screen image buffer and transferred to the on-screen buffer when the transitional image is to be displayed.

18. The embedded system as claimed in claim 11, wherein the 3D OSD shows a 3D cube rotational effect.

19. The embedded system as claimed in claim 11, wherein the 3D OSD shows a 3D page-turning effect.

20. The embedded system as claimed in claim 11, wherein the 3D OSD shows a rotational menu with a depth and focal effect.

* * * * *